US 10,715,626 B2

(12) United States Patent
Jagota et al.

(10) Patent No.: US 10,715,626 B2
(45) Date of Patent: Jul. 14, 2020

(54) ACCOUNT ROUTING TO USER ACCOUNT SETS

(71) Applicant: salesforce.com, inc., San Francisco, CA (US)

(72) Inventors: Arun Kumar Jagota, Sunnyvale, CA (US); Sancho S. Pinto, Alameda, CA (US); Saurin G. Shah, Belmont, CA (US); Stanislav Georgiev, Sunnyvale, CA (US)

(*) Notice: Subject to any disclaimer, the term of this patent is extended or adjusted under 35 U.S.C. 154(b) by 190 days.

(21) Appl. No.: 14/751,401

(22) Filed: Jun. 26, 2015

(65) Prior Publication Data

US 2016/0378759 A1 Dec. 29, 2016

(51) Int. Cl.
| G06F 16/00 | (2019.01) |
| H04L 29/08 | (2006.01) |
| G06Q 30/00 | (2012.01) |
| G06F 16/33 | (2019.01) |

(52) U.S. Cl.
CPC ........ H04L 67/306 (2013.01); G06F 16/3346 (2019.01); G06Q 30/01 (2013.01)

(58) Field of Classification Search
CPC .......................... G06F 17/3053; G06F 16/3346
See application file for complete search history.

(56) References Cited

U.S. PATENT DOCUMENTS

| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |

(Continued)

FOREIGN PATENT DOCUMENTS

| WO | 06/47790 A2 | 5/2006 |
| WO | 06/47790 A3 | 5/2006 |

OTHER PUBLICATIONS

U.S. Appl. No. 13/998,890.
U.S. Appl. No. 13/986,251, filed Apr. 16, 2013.
Jackson, Tyrone. "CRM: From 'art to science'." Journal of Database Marketing & Customer Strategy Management 13.1 (2005): 76-92. (Year: 2005).
Lemaire et al., "Contact Personalization using a Score Understanding Method," 2008 IEEE International Joint Conference on Neural Networks (IEEE World Congress on Computational Intelligence).

*Primary Examiner* — Ajith Jacob
(74) *Attorney, Agent, or Firm* — Dergosits & Noah LLP; Todd A. Noah

(57) ABSTRACT

New account routing to user account sets is described. A system creates multiple accounts profiles corresponding to multiple sets of accounts, based on multiple attributes associated with each account of the multiple sets of accounts. The system calculates multiple account scores for an account based on comparing multiple attributes associated with the account against the corresponding multiple accounts profiles, wherein the account is not in the multiple sets of accounts. The system identifies a highest account score of the multiple account scores. The system routes the account to a user associated with a set of accounts corresponding to the highest account score.

20 Claims, 4 Drawing Sheets

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,915,270 B1 | 7/2005 | Young et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,730,478 B2 | 6/2010 | Weissman |
| 7,779,039 B2 | 8/2010 | Weissman et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,245,257 B2 | 1/2016 | McConnell |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0173889 A1 | 8/2006 | Haft et al. |
| 2009/0063415 A1 | 3/2009 | Chatfield et al. |
| 2009/0100342 A1 | 4/2009 | Rueben et al. |
| 2009/0163183 A1 | 6/2009 | O'Donoghue et al. |
| 2009/0177744 A1 | 7/2009 | Marlow et al. |
| 2010/0114665 A1 | 5/2010 | Stengard et al. |
| 2010/0169067 A1 | 7/2010 | Basel |
| 2010/0179860 A1 | 7/2010 | Noel |
| 2012/0150888 A1* | 6/2012 | Hyatt ............... G06F 17/30528 707/758 |
| 2012/0233137 A1 | 9/2012 | Jakobson et al. |
| 2013/0124257 A1 | 5/2013 | Schubert |
| 2013/0218880 A1 | 8/2013 | McConnell |
| 2013/0218948 A1 | 8/2013 | Jakobson |
| 2013/0218949 A1 | 8/2013 | Jakobson |
| 2013/0218966 A1 | 8/2013 | Jakobson |
| 2013/0262320 A1 | 10/2013 | Makanawala et al. |
| 2013/0282417 A1 | 10/2013 | Gaedcke et al. |
| 2014/0025692 A1 | 1/2014 | Pappas |
| 2014/0040162 A1 | 2/2014 | McConnell |
| 2014/0122472 A1* | 5/2014 | Wells ............... G06F 17/30864 707/732 |
| 2014/0207506 A1 | 7/2014 | Palmert et al. |
| 2014/0344013 A1 | 11/2014 | Karty et al. |
| 2014/0358634 A1 | 12/2014 | Schnabl et al. |
| 2014/0359537 A1 | 12/2014 | Jakobson et al. |
| 2015/0006248 A1 | 1/2015 | Li et al. |
| 2015/0007050 A1 | 1/2015 | Jakobson et al. |
| 2015/0095162 A1 | 4/2015 | Jakobson et al. |
| 2015/0269647 A1 | 9/2015 | Jagota et al. |
| 2016/0247163 A1 | 8/2016 | Donsky et al. |
| 2016/0378759 A1 | 12/2016 | Jagota |
| 2016/0379265 A1 | 12/2016 | Jagota |

* cited by examiner

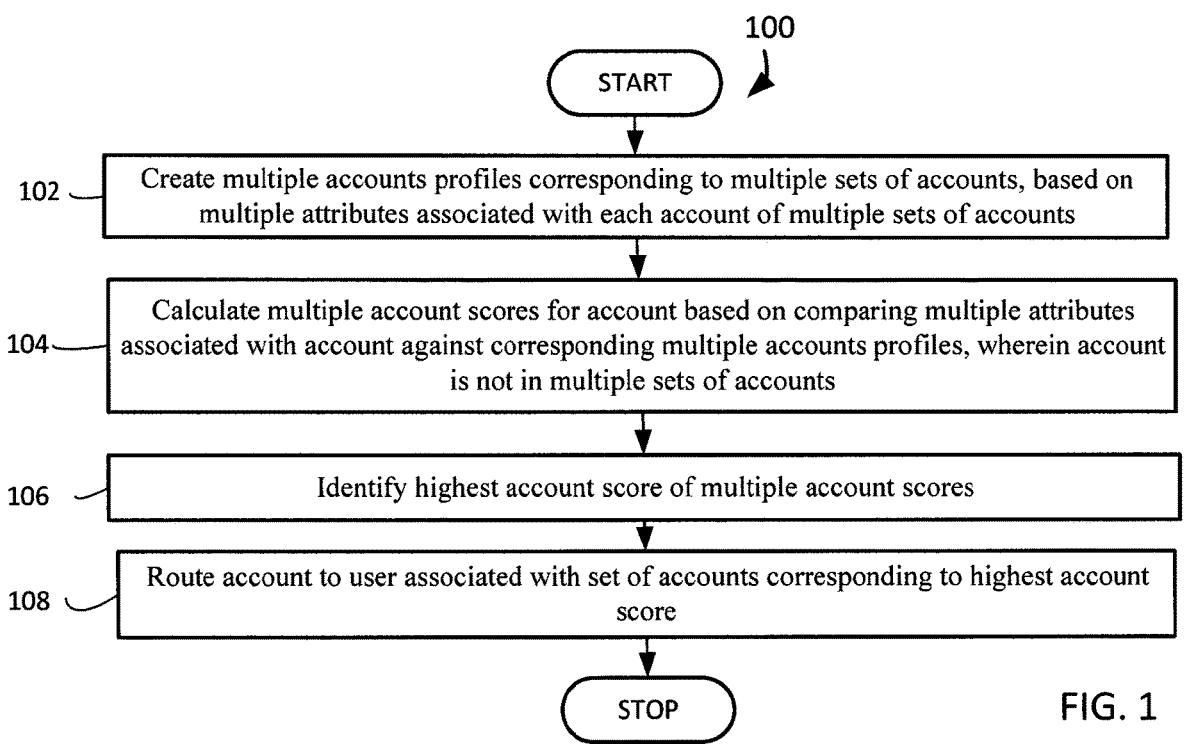

ACCOUNT ROUTING TO USER ACCOUNT SETS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Customer relationship management (CRM) refers to methodologies and strategies for helping an enterprise develop and manage customer relationships in an organized way. A CRM system typically refers to a software-based solution implemented on one or more computer devices that collect, organize, and manage customer and sales information. Most CRM systems include features that allow an enterprise to track and record interactions, including emails, documents, jobs, faxes, and scheduling. These systems typically focus on accounts rather than on individual contacts. They also generally include opportunity insight for tracking sales pipelines, and can include added functionality for marketing and service. Other CRM systems also offer sales force automation features that streamline all phases of the sales process. For example, such CRM systems can support tracking and recording every stage in the sales process for each prospective client, from initial contact to final disposition. In addition, CRM systems can support enterprise marketing, technical/customer support and service, event and meeting calendaring, and predictive analytics.

Typically, a CRM system can collect, store, and analyze volumes of information depending on the various features supported. This information can be accessed by enterprise personnel across different groups, such as marketing, sales, technical support, and in some cases, by customers and external business partners. Accordingly, a CRM system can support and encourage collaboration between enterprise groups, and can help an enterprise to understand and to identify its customer needs, and effectively to build relationships between the enterprise, its customer base, and external partners. A single user may be responsible for a particular set of CRM accounts with some distinct characteristic, such as a single territory, and may be referred to as an account executive, a sales representative, or a sales representative.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 1 is an operational flow diagram illustrating a high level overview of a method for new account routing to user account sets, in an embodiment;

DETAILED DESCRIPTION

General Overview

Figure 2A:
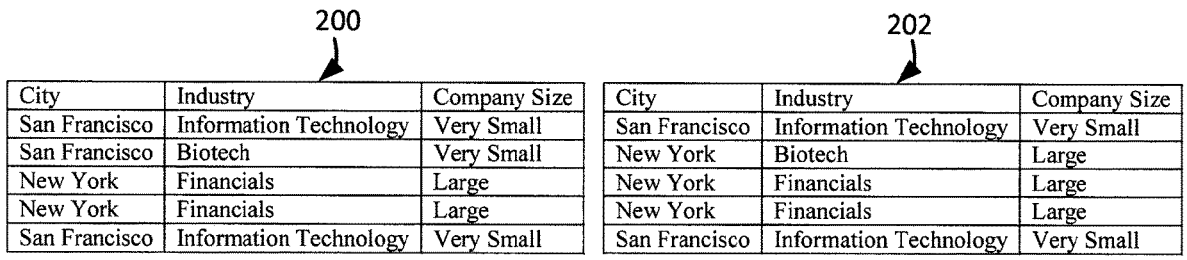
FIGS. 2A-2C illustrate example tables for firmographic attributes in user account sets, accounts profiles, and account scores, in an embodiment.

Systems and methods are provided for new account routing to user account sets. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, mechanisms and methods for new account routing to user account sets will be described with reference to example embodiments. The following detailed description will first describe a method for new account routing to user account sets. Next, example tables for new account routing to user account sets are described.

In accordance with embodiments described herein, there are provided systems and methods for new account routing to user account sets. Multiple accounts profiles are created corresponding to multiple sets of accounts, based on multiple attributes associated with each account of the multiple sets of accounts. Multiple account scores are calculated for an account based on comparing multiple attributes associated with the account against the corresponding multiple accounts profiles, wherein the account is not in the multiple sets of accounts. The highest account score is identified of the multiple account scores. The account is routed to a user associated with a set of accounts corresponding to the highest account score.

For example, a system creates a first accounts profile for a first sales representative's set of accounts, captured as the probability that the city is San Francisco=0.6 and the probability that the city is New York=0.4; the probability that the industry is information technology=0.4, the probability that the industry is financials=0.4, and the probability that the industry is biotech=0.2; the probability that the company size is very small=0.6 and the probability that the company size is large=0.4. Continuing this example, the system also creates a second accounts profile for a second sales representative's set of accounts, based on the probability that the city is San Francisco=0.4 and the probability that the city is New York=0.6; the probability that the industry is information technology=0.4, the probability that the industry is financials=0.4, and the probability that the industry is biotech=0.2; the probability that the company size is very small=0.4 and the probability that the company size is large=0.6. The system calculates a first account score of 9.57 for a new account against the first sales representative's accounts profile and calculates a second accounts score of 8.76 for the new account against the second sales representative's accounts profile, wherein the new account's properties are San Francisco, information technology, and very small, and the new account is not in the first sales representative's set of accounts or the second sales representative's set of accounts. The system identifies the account score of 9.57 as the highest for the new account. The system routes the new account to the first sales representative, whose accounts profile resulted in the new account's highest account score of 9.57. The system routes a new account to the sales representative whose accounts profile indicates the most similarity to the new account, which can enable an enterprise to most efficiently allocate potential new clients to sales representatives who are most familiar with similar clients.

While one or more implementations and techniques are described with reference to an embodiment in which new account routing to user account sets is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

A CRM system can train a firmographic properties model on data that is specific to a sales representative's set of accounts. Each row in the firmographic model for a specific sales representative corresponds to a particular account of the sales representative, and has the form $(x_1, x_2, \ldots x_n, y, t)$, where $x_1, x_2, \ldots x_n$ are values of n firmographic attributes, y is a value of a suitable success attribute (such as average order value band), and t is a suitable value of time for the account's record. For example, the firmographic model for a sales representative includes the firmographic attributes for a client's city, industry, and company size; the success attribute is the revenue made from the client's account; and the time is the date of most recent sale to the client. Extremely simplified examples of firmographic attributes for two sales representatives' sets of accounts are described below in reference to FIG. 2A.

FIG. 1 is an operational flow diagram illustrating a high level overview of a method 100 for new account routing to user account sets. As shown in FIG. 1, a system can route new accounts to user account sets.

A system creates multiple accounts profiles corresponding to multiple sets of accounts, based on multiple attributes associated with each account of the multiple sets of accounts, block 102. For example and without limitation, this can include the system creating a first accounts profile for a first sales representative's set of accounts, capturing the probability that the city is San Francisco=0.6 and the probability that the city is New York=0.4; the probability that the industry is information technology=0.4, the probability that the industry is financials=0.4, and the probability that the industry is biotech=0.2; the probability that the company size is very small=0.6, and the probability that the company size is large=0.4.

Continuing this example, the system creates a second accounts profile for a second sales representative's set of accounts, based on the probability that the city is San Francisco=0.4 and the probability that the city is New York=0.6; the probability that the industry is information technology=0.4, the probability that the industry is financials=0.4, and the probability that the industry is biotech=0.2; the probability that the company size is very small=0.4, and the probability that the company size is large=0.6. Although these two example accounts profiles are based on only three attributes with probabilities expressed as fractions, the system can create any number of accounts profiles based on any number of attributes with probabilities expressed as any type of number. Two extremely simplified examples of accounts profiles for two sales representatives' sets of accounts are described below in reference to FIG. 2B.

When creating an accounts profile for a sales representative's set of accounts, the system can filter the sales representative's set of accounts based on a success variable rather than using all of the accounts in the sales representative's set of accounts. Filtering accounts based on a success variable can enable the system to identify an individual new account which has firmographic attributes which are similar to the firmographic attributes of accounts with which the sales representative has been successful. The sales representative is more likely to be successful with new accounts that are similar to accounts with which the sales representative has already been successful, rather than similar to all of the accounts for which the sales representative is responsible.

When creating an accounts profile for a sales representative's set of accounts, the system can use recency-weighting for each account of the sales representative's set of accounts. For each attribute in the accounts profile, the system can capture the recency-weighted relative frequencies of the values of this attribute in the user's historical data. Recency-weighting can enable the system to create an accounts profile that is influenced more by recent data than by older data. It is as if the system has assigned to each tuple $(x_1, x_2, \ldots x_n, y, t)$, in the sales representative's set of accounts, a recency weight $w=e^{-a(now-t)/b}$ for suitably chosen a and b, and replaced, in the sales representative's set of accounts, this tuple by w copies of this tuple. One example of the value a/b is the fraction 0.01. In view of recency weighting, more recent tuples can have a higher frequency. Recency weighting can enable the system to adapt the firmographic model as a sales representative's data changes. For an example using nominal values of a success attribute, the system identifies the mode of the success attribute in a set of accounts, removes the outliers, which are the rows with different values of the success attribute than the mode of the success attribute, and creates the accounts profile based on the rows with the mode of the success attribute.

For an example using real values of a success attribute, the system identifies the mean and standard deviation of the success attribute in a sales representative's set of accounts, removes the outliers, such as the rows with values of the success attribute at least a specified number of standard deviations away from the mean of the success attribute, and creates the accounts profile based on the rows with values of the success attribute which are less than the specified number (such as two) of standard deviations away from the mean. Creating the profile means constructing $P_i(X_i)$ for each attribute $X_i$, which is the probability distribution over the various values of $x_i$. An accounts profile has n probability distributions $P_1, P_2, \ldots P_n$. The system can present an accounts profile to a system user for confirmation and possible modification.

When creating an accounts profile for a sales representative's set of accounts, the system may need to accommodate a missing attribute value in the firmographic attributes associated with the sales representative's set of accounts because some fields in some records of the sales representative's accounts may not be populated. The system can estimate $P_i(X_i)$ from only the non-missing values of the attribute with the missing values in the set of accounts. For example, if a sales representative has 100 accounts in her set of accounts, 60 of the accounts specify city=San Francisco, 20 of the accounts specify city=Palo Alto, and 20 of the accounts are missing the value for city, the system calculates $P_{city}$(San Francisco)=60/80 and calculates $P_{city}$(Palo Alto)=20/80, thereby accommodating for the missing city values.

When creating an accounts profile for a sales representative's set of accounts, the system can use a user-provided attribute preference. User input can be blended into an accounts profile via pseudo-counts by the accounts profile modeling the combination of the user's historical data and the user's explicit attribute preferences. For example, if a user explicitly indicates her preference for accounts in the information technology industry, then the system generates pseudo counts of industry=information technology to create the user's accounts profile. Any change made by the user can generate suitable pseudo counts that adjust the relevant probability distributions among $P_1, P_2, \ldots P_n$. In another example, if a sales representative's account profile reveals that the sales representative has historically concentrated on very small companies, but the sales representative inputs an explicit preference for medium size companies, then the system generates a suitable number of pseudo counts for company size=medium, and adjust the probability distribution P(company size) accordingly.

In addition to a sales representative who is responsible for a set of accounts, the set of accounts may be associated with multiple other users and/or a random sampling of accounts to address a cold start problem. A cold-start problem occurs when a sales representative has no historical data or very little historical data. The system can handle such a cold start problem via the generation of pseudo-counts: The system can generate pseudo-counts from suitable mixtures of the accounts profiles of other members of a sales representative's team, such that the accounts profile of a new user can be seeded to be similar to the accounts profiles of the team members, even when the new user has no historical data and has not provided any attribute preferences. These other accounts profiles are expressed in terms of prior distributions $\{P_i(X_i)\}$.

In addition, the system can generate pseudo counts from these other accounts profiles, using a parameter n to control the weight allocated in using these other account profiles to seed a new user's accounts profile. The system can generate pseudo-counts from a random sample of the universe of all users' accounts, which may be referred to as a reference distribution $Q_i$, such that the firmographic model is initially neutral when a sales representative has no historical data or very little historical data. Whether the system uses accounts profiles of team members, random sampling from a reference distribution $Q_i$, or any combination thereof, the system can automatically adapt a new user's accounts profile to the new user's historical data as this historical data enters the system.

When creating an accounts profile for a sales representative's set of accounts, the system can adjust for an attribute dependency among the attributes associated with the sales representative's set of accounts. The system's account scoring function can assume that all the firmographic attributes are independent, which is a simplifying assumption and an assumption that allows user attribute preferences to be input in terms of individual attribute values. However, this independence assumption may not always be valid. For example, a company's size (based on the number of a company's employees) and the company's revenue may be strongly correlated. Dependencies among attributes can be modeled via suitable local conditional probability distributions, which are discussed below in reference to the account scoring function described for block 104.

When creating an accounts profile for a set of accounts, the system m can ay use more than one user success attribute for a sales representative's set of accounts. The system can model arbitrarily complex success functions, provided that these arbitrarily complex success functions return a Boolean value—success (true) or fail (false)—when applied to an account in the user's data. For a given success variable y, the system's modeling approach can identify a subset of a sales representative's set of accounts that is restricted to "central" y values, and build an account profile model from this subset. A requirement for using multiple user success attributes is producing a single subset of a sales representative's set of accounts, from which the system builds an accounts profile model. Following are some examples of suitable generalizations.

In addition to excluding rows for a sales representative's accounts whose y values are outliers, the system can also exclude those rows (and their corresponding accounts) which indicate a high opportunity cost, such as the number of days taken to close the deal. The system can use more than one success variable, such as one success attribute for revenue made from an account (order value band) and another success attribute for moved to next stage (true or false). In the case of multiple success attributes, the system can create a new success attribute which is an OR of the multiple success attributes. For example, the system deems a row for an account to represent a success if the account's revenue made is not an outlier or if the account has moved to the next stage, such as from an initiate contact stage to identify needs stage, from the identify needs stage to a present offer stage, or from the present offer stage to a closing stage. This multiple success attribute approach can help when there have been few successes of one type.

The system calculates multiple account scores for an account based on comparing multiple attributes associated with the account against the corresponding multiple accounts profiles, wherein the account is not in the multiple sets of accounts, block 104. By way of example and without limitation, this can include the system calculating a first account score of 9.57 for a new account against the first sales representative's accounts profile and calculating a second accounts score of 8.76 for the new account against the second sales representative's accounts profile, wherein the new account's properties are San Francisco, information technology, and very small. Although these two example account scores are expressed as a decimal-based number calculated from only three attributes, the system can calculate any number of account scores expressed as any type of number calculated from any number of attributes. Two extremely simplified examples of account scores for a new account compared to two sales representatives' accounts profiles are described below in reference to FIG. 2C.

The system calculates an account score for a new account based on comparing the new account against a user's accounts profile to quantify how similar the new account is to the user's historical accounts. An account score can favor new accounts that are similar to a sales representative's recent accounts than to the sales representative's older accounts, automatically adapting to the changing characteristics of the sales representative's set of accounts. In addition, an account score may not over-penalize a new account when the value of only one attribute value is not identified in a sales representative's accounts profile and all other attribute values are similar to values in the sales representative's accounts profile. An account score can leverage the combination of historical data and a user's explicit attribute preferences. An account score can work well even for a new user, provided that the system has seeded the new user's account profile with suitable pseudo-counts.

Further, the account score can be influenced more by those attributes whose values in the new account being scored have significantly different probabilities than those in a reference profile, which can be constructed from a suitable universe of the accounts of all users. For example, if a certain attribute value is rare in the population (such as when a company size is very large) but common in a user's account profile (this user handles only very large companies with certain other characteristics), then the account score can be influenced more by a new account specifying the company size as very large than influenced by other attribute values of the account. The system can automatically learn that attribute values that are rare in the population but common in a user's accounts profile are more important than other attribute values.

The system can calculate an account score for a new account when the values of some attributes for the new account are unknown. A new account represented by the vector $X=(x_1, x_2, \ldots x_n)$ is scored against this firmographic model as follows:

$$score(X,P)=\Pi_i P_i(x_i)$$

In practice, a log transformed version of this equation may be used for numeric stability. In practice, an odds version of this equation may be even better:

$$score(X,P)=\Pi_i P_i(x_i)/Q_i(x_i)$$

Here $Q_i(x_i)$ is the probability of the attribute $X_i$ having the value $x_i$ in a suitable universe, such as Dun & Bradstreet's business information. This odds version equation is influenced more by attributes in $X_i$ whose values deviate significantly, in a probabilistic sense, from those in the reference distributions $\{Q_i\}$. A log transformed version of the odds version equation may be used because the log transformed version may be numerically more stable, and because the log transformed version has a convenient interpretation: 0 denotes a neutral score, greater than 0 denotes a positive affinity, and less than 0 denotes a negative affinity.

$$score(X,P)=\Sigma_i \log P_i(x_i)/Q_i(x_i)$$

If some values in X are missing, the system can handle the missing values by restricting the i in the log-transformed version to only attributes whose values are not null in $X_i$.

When the system seeds the firmographic model with pseudo counts generated from the reference distributions $Q_i$, the system assumes that a new user is interested in every firmographic property in proportion to the property's density in the universe of all users' accounts. In this case, the account score of any particular account is:

$$\approx \Sigma_i \log Q'_i(x_i)/(Q_i(x_i)=0$$

Here, the $Q'_i(x_i)$ in the numerator is an approximation of $Q_i(x_i)$ because the pseudo counts is generated from $\{Q_i\}$. The system's pseudo counts generator can use a parameter n to specify the number of pseudo examples from which the pseudo counts are generated. In the following example, the parameter n is set to 150 and applied to the firmographic attribute for industry. If 2% of the companies in the universe of all users' accounts have the value information technology for the attribute industry, then the system generates three (which is 2% of 150) pseudo counts for the attribute industry to specify the value information technology. Such use of the parameter n can enable the system's modeler to allocate the weight given to prior beliefs relative to the weight given to historical data. A large value of the parameter n favors prior beliefs, while a small value of the parameter n favors historical data.

Adjusting for dependencies among attributes can lead to a more accurate account scoring function than an account scoring function that assumes attribute independence. One model which allows dependencies to be factored in is the Bayes Network. In the following equation, all attributes are assumed to be independent:

$$P(X_1,X_2, \ldots X_n)=P_1(X_1)*P_2(X_2)* \ldots *P_n(X_n)$$

A Bayes network generalizes this equation to:

$$P(X_1,X_2, \ldots X_n)=\Pi^n_i P_i(X_i|\pi(X_i))$$

Here, $P_i$ is a probability distribution over the values of attribute $X_i$, but $P_i$ is conditioned on the values of certain other attributes $\pi(X_i)$, which may be referred to as the parents of $X_i$. The dependencies structure induced by these parents can form a directed acylic graph. The nodes of this graph are $X_1, X_2, \ldots X_n$. There is an arc in this graph from $X_i$ to $X_j$ if $X_i$ is a parent of $X_j$. The system can generalize the account scoring function to use the same Bayes Network structure for both the distributions of the sales representative and for the universe of all users' accounts. The only differences in the Bayes Networks are in their parameters, the actual probabilities in the various probability distributions. The generalized version of the system's account scoring function is:

$$score(X,P)=\Sigma_i \log P_i(x_i|\pi(x_i))/Q_i(x_i|\pi(x_i))$$

Below is a simple example of a Bayes network that may be more accurate than the independent model. For n firmographic attributes $X_1, X_2, \ldots X_n$, there is a single arc $X_1 \rightarrow X_2$, where $X_1$ is the number of company employees and $X_2$ is company revenue. The generalized probability equation specializes to:

$$P(X_1,X_2, \ldots X_n)= P_1(X_1)*P_2(X_2|X_1)*P_3(X_3)* \ldots *P_n(X_n)$$

For this example, the system's account scoring function specializes to:

$$score(X,P)=\log P_1(x_1)/Q_1(x_1)+\log P_2(x_2|x_1)/Q_2(x_2|x_1)+\log P_3(x_3)/Q_3(x_3)+ \ldots \log P_n(x_n)/Q_n(x_n)$$

The system identifies the highest account score of the multiple account scores, block 106. In embodiments, this can include the system identifying the account score of 9.57 as the highest for the new account. Although this example describes the comparison two account scores of decimal-based numbers to identify the highest account score, the system can compare any type of number for any number of account scores to identify the highest account score, or the lowest account score, depending on the system's account scoring function.

The system routes the account to a user associated with a set of accounts corresponding to the highest account score, block 108. For example and without limitation, this can include the system routing the new account to the first sales representative, whose accounts profile resulted in the new account's highest account score of 9.57. Although this example describes the system routing a new account to one of two sales representatives, the system can route a new account to one of any number of sales representatives. Extremely simplified examples of two account scores for a new account compared to two sales representatives' accounts profiles are described below in reference to FIG. 2C.

The method 100 may be repeated as desired. Although this disclosure describes the blocks 102-108 executing in a particular order, the blocks 102-108 may be executed in a different order. In other implementations, each of the blocks 102-108 may also be executed in combination with other blocks and/or some blocks may be divided into a different set of blocks.

Figure 2B:
Figure 2C:
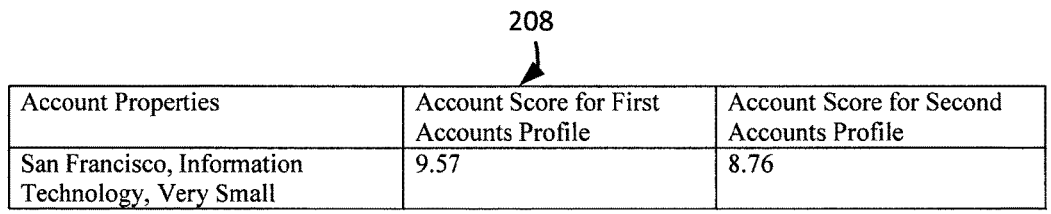

FIGS. 2A-2C illustrate example tables for firmographic attributes, accounts profiles, and account scores, in an embodiment. FIG. 2A illustrates the extremely simplified example tables 200 and 202 which depict firmographic attributes for two sales representatives' sets of accounts. The first row of data in the table 200 depicts firmographic attributes for the first account in the first sales representative's set of accounts, and specify that city=San Francisco, industry=information technology, and company size=very small. The two accounts represented by the first and fifth rows of data in the table 200 have the same firmographic properties, and the two accounts represented by the third and fourth rows of data in the table 200 have the same firmographic properties. Although these extremely simplified example tables of firmographic attributes are based on only three attributes for five accounts each for two sales representatives, tables of firmographic attributes may be based on any number of attributes for any number of accounts for any number of sales representatives.

FIG. 2B illustrates the extremely simplified example tables 204 and 206 which depict two accounts profiles for the two sales representatives' sets of accounts. The first row of data in the accounts profile in table 204 indicates that the probability of the city attribute value in the first sales representative's set of accounts specifying the city of San Francisco equals 0.6 because three of the five accounts represented in table 200 specify the city of San Francisco as the city attribute value. The second row of data in the accounts profile in table 204 indicates that the probability of the city attribute value in the first sales representative's set of accounts specifying the city of New York equals 0.4 because two of the five accounts represented in table 200 specify the city of New York as the city attribute value. Although these extremely simplified accounts profiles are based on only three attributes for five accounts each for two sales representatives, any number of accounts profiles may be based on any number of attributes for any number of accounts for any number of sales representatives.

FIG. 2C illustrates the extremely simplified example table 208 which depicts account scores for a new account compared to the two accounts profiles based on the two sales representatives' sets of accounts. The first row of data in table 208 indicates an account score of 9.57 for a new account with the account properties of city=San Francisco, industry=information technology, and company size=very small, compared to the first accounts profile. This account score of 9.57 is based on the profile $Q_i$ in which for every city c, $Q_{city}(c)=0.001$, for every industry i, $Q_{industry}(i)=0.04$, and for every company size cs, $Q_{companysize}(cs)=0.25$. Therefore, the account score of 9.57 equals $\log(0.6/0.001)+\log(0.4/0.04)+\log(0.6/0.25)$, which represent the individual log calculations for city, industry, and company size for the first accounts profile, respectively. Although these two extremely simplified account scores are decimal-based numbers calculated from only three attributes, an account score may be any type of number calculated from any number of attributes.

System Overview

Figure 3:
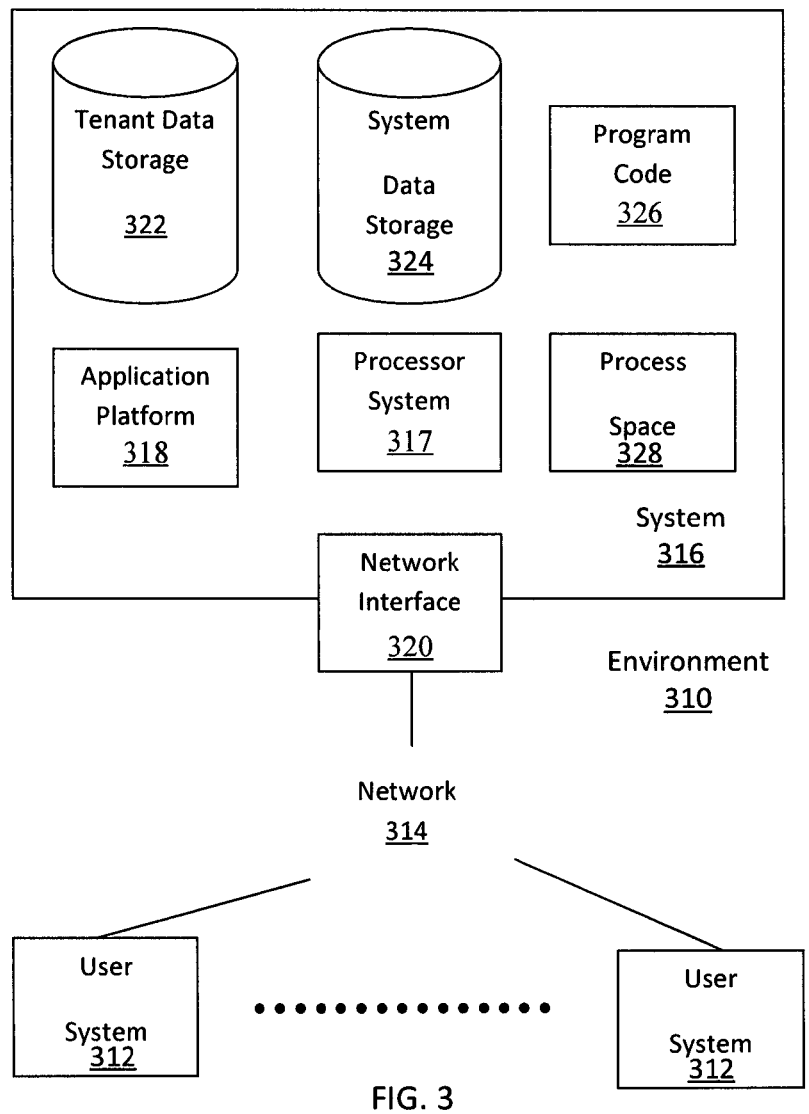
FIG. 3 illustrates a block diagram of an example of an environment wherein an on-demand database service might be used.

FIG. 3 illustrates a block diagram of an environment 310 wherein an on-demand database service might be used. The environment 310 may include user systems 312, a network 314, a system 316, a processor system 317, an application platform 318, a network interface 320, a tenant data storage 322, a system data storage 324, program code 326, and a process space 328. In other embodiments, the environment 310 may not have all of the components listed and/or may have other elements instead of, or in addition to, those listed above.

The environment 310 is an environment in which an on-demand database service exists. A user system 312 may be any machine or system that is used by a user to access a database user system. For example, any of the user systems 312 may be a handheld computing device, a mobile phone, a laptop computer, a work station, and/or a network of computing devices. As illustrated in FIG. 3 (and in more detail in FIG. 4) the user systems 312 might interact via the network 314 with an on-demand database service, which is the system 316.

An on-demand database service, such as the system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 316" and the "system 316" will be used interchangeably herein. A database image may include one or more database objects. A relational database management system (RDMS) or the equivalent may execute storage and retrieval of information against the database object(s). The application platform 318 may be a framework that allows the applications of the system 316 to run, such as the hardware and/or software, e.g., the operating system. In an embodiment, the on-demand database service 316 may include the application platform 318 which enables creation, managing and executing one or more applications developed by the provider of the on-demand database service, users accessing the on-demand database service via user systems 312, or third party application developers accessing the on-demand database service via the user systems 312.

The users of the user systems 312 may differ in their respective capacities, and the capacity of a particular user system 312 might be entirely determined by permissions (permission levels) for the current user. For example, where a salesperson is using a particular user system 312 to interact with the system 316, that user system 312 has the capacities allotted to that salesperson. However, while an administrator is using that user system 312 to interact with the system 316, that user system 312 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 314 is any network or combination of networks of devices that communicate with one another. For example, the network 314 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 312 might communicate with the system 316 using TCP/IP and, at a higher network level, use other common Internet protocols to communicate, such as HTTP, FTP, AFS, WAP, etc. In an example where HTTP is used, the user systems 312 might include an HTTP client commonly referred to as a "browser" for sending and receiving HTTP messages to and from an HTTP server at the system 316. Such an HTTP server might be implemented as the sole network interface between the system 316 and the network 314, but other techniques might be used as well or instead. In some implementations, the interface between the system 316 and the network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 316, shown in FIG. 3, implements a web-based customer relationship management (CRM) system. For example, in one embodiment, the system 316 includes application servers configured to implement and execute CRM software applications as well as provide related data, code, forms, webpages and other information to and from the user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 316 implements applications other than, or in addition to, a CRM application. For example, the system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of the system 316 is shown in FIG. 3, including the network interface 320, the application platform 318, the tenant data storage 322 for tenant data 323, the system data storage 324 for system data 325 accessible to the system 316 and possibly multiple tenants, the program code 326 for implementing various functions of the system 316, and the process space 328 for executing MTS system processes and tenant-specific processes, such as running applications as part of an application hosting service. Additional processes that may execute on the system 316 include database indexing processes.

Several elements in the system shown in FIG. 3 include conventional, well-known elements that are explained only briefly here. For example, each of the user systems 312 could include a desktop personal computer, workstation, laptop, PDA, cell phone, or any wireless access protocol (WAP) enabled device or any other computing device capable of interfacing directly or indirectly to the Internet or other network connection. Each of the user systems 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 312 to access, process and view information, pages and applications available to it from the system 316 over the network 314. Each of the user systems 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 316 or other systems or servers. For example, the user interface device may be used to access data and applications hosted by the system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 312 and all of its components are operator configurable using applications, such as a browser, including computer code run using a central processing unit such as an Intel Pentium® processor or the like. Similarly, the system 316 (and additional instances of an MTS, where more than one is present) and all of their components might be operator configurable using application(s) including computer code to run using a central processing unit such as the processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 316 is configured to provide webpages, forms, applications, data and media content to the user (client) systems 312 to support the access by the user systems 312 as tenants of the system 316. As such, the system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
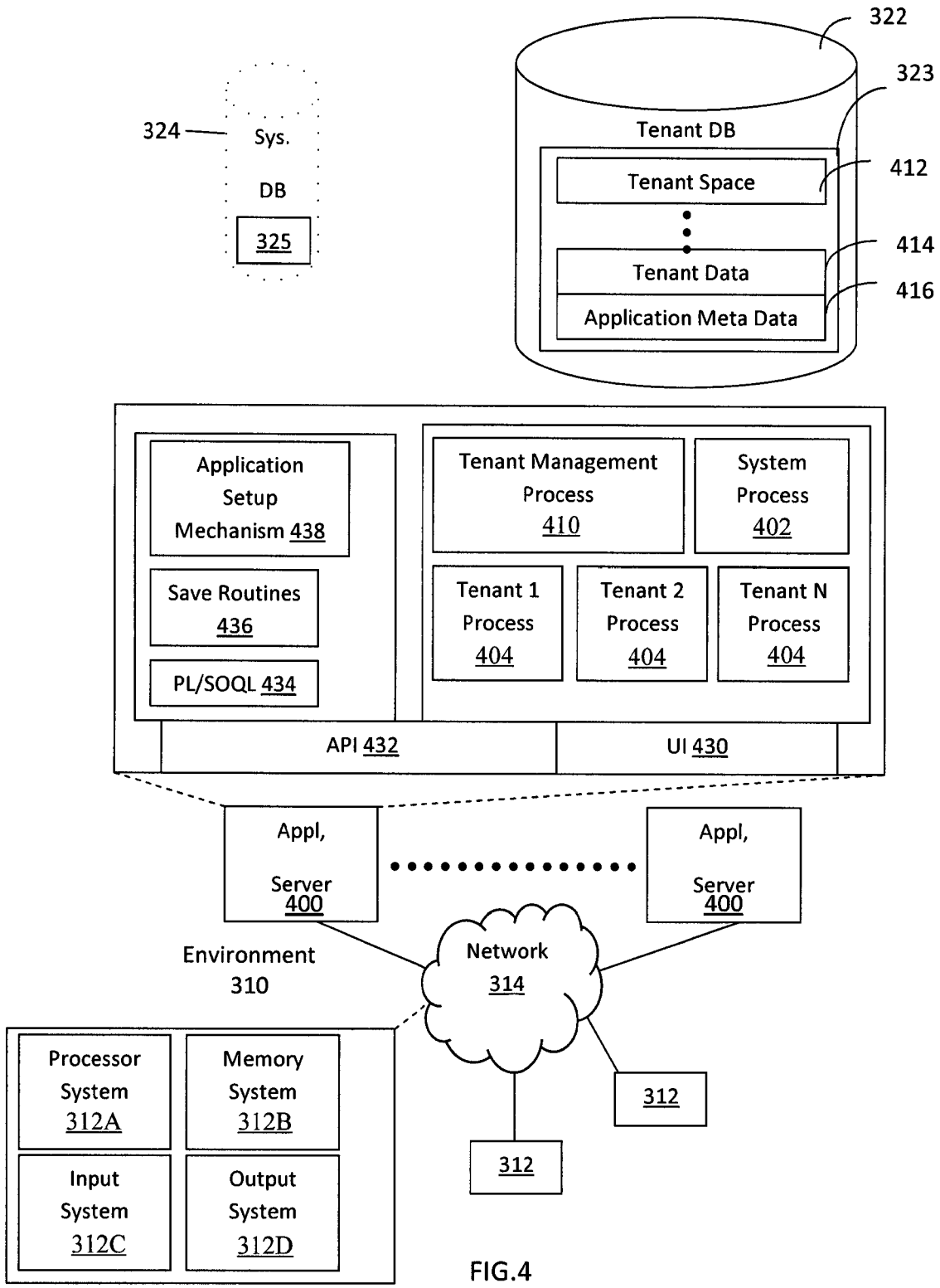
FIG. 4 illustrates a block diagram of an embodiment of elements of FIG. 3 and various possible interconnections between these elements.

FIG. 4 also illustrates the environment 310. However, in FIG. 4 elements of the system 316 and various interconnections in an embodiment are further illustrated. FIG. 4 shows that the each of the user systems 312 may include a processor system 312A, a memory system 312B, an input system 312C, and an output system 312D. FIG. 4 shows the network 314 and the system 316. FIG. 4 also shows that the system 316 may include the tenant data storage 322, the tenant data 323, the system data storage 324, the system data 325, a User Interface (UI) 430, an Application Program Interface (API) 432, a PL/SOQL 434, save routines 436, an application setup mechanism 438, applications servers 4001-400N, a system process space 402, tenant process spaces 404, a tenant management process space 410, a tenant storage area 412, a user storage 414, and application metadata 416. In other embodiments, the environment 310 may not have the same elements as those listed above and/or may have other elements instead of, or in addition to, those listed above.

The user systems 312, the network 314, the system 316, the tenant data storage 322, and the system data storage 324 were discussed above in FIG. 3. Regarding the user systems 312, the processor system 312A may be any combination of one or more processors. The memory system 312B may be any combination of one or more memory devices, short term, and/or long term memory. The input system 312C may be any combination of input devices, such as one or more keyboards, mice, trackballs, scanners, cameras, and/or interfaces to networks. The output system 312D may be any combination of output devices, such as one or more monitors, printers, and/or interfaces to networks. As shown by FIG. 4, the system 316 may include the network interface 320 (of FIG. 3) implemented as a set of HTTP application servers 400, the application platform 318, the tenant data storage 322, and the system data storage 324. Also shown is the system process space 402, including individual tenant process spaces 404 and the tenant management process space 410. Each application server 400 may be configured to access tenant data storage 322 and the tenant data 323 therein, and the system data storage 324 and the system data 325 therein to serve requests of the user systems 312. The tenant data 323 might be divided into individual tenant storage areas 412, which can be either a physical arrangement and/or a logical arrangement of data. Within each tenant storage area 412, the user storage 414 and the application metadata 416 might be similarly allocated for each user. For example, a copy of a user's most recently used (MRU) items might be stored to the user storage 414. Similarly, a copy of MRU items for an entire organization that is a tenant might be stored to the tenant storage area 412. The UI 430 provides a user interface and the API 432 provides an application programmer interface to the system 316 resident processes to users and/or developers at the user systems 312. The tenant data and the system data may be stored in various databases, such as one or more Oracle™ databases.

The application platform 318 includes the application setup mechanism 438 that supports application developers' creation and management of applications, which may be saved as metadata into the tenant data storage 322 by the save routines 436 for execution by subscribers as one or more tenant process spaces 404 managed by the tenant management process 410 for example. Invocations to such applications may be coded using the PL/SOQL 434 that provides a programming language style interface extension to the API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 416 for the subscriber making the invocation and executing the metadata as an application in a virtual machine.

Each application server 400 may be communicably coupled to database systems, e.g., having access to the system data 325 and the tenant data 323, via a different network connection. For example, one application server 4001 might be coupled via the network 314 (e.g., the Internet), another application server 400N-1 might be coupled via a direct network link, and another application server 400N might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, the system 316 is multi-tenant, wherein the system 316 handles storage of, and access to, different objects, data and applications across disparate users and organizations.

As an example of storage, one tenant might be a company that employs a sales force where each salesperson uses the system 316 to manage their sales process. Thus, a user might maintain contact data, leads data, customer follow-up data, performance data, goals and progress data, etc., all applicable to that user's personal sales process (e.g., in the tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 316 might also maintain system level data usable by multiple tenants or other data. Such system level data might include industry reports, news, postings, and the like that are sharable among tenants.

In certain embodiments, the user systems 312 (which may be client systems) communicate with the application servers 400 to request and update system-level and tenant-level data from the system 316 that may require sending one or more queries to the tenant data storage 322 and/or the system data storage 324. The system 316 (e.g., an application server 400 in the system 316) automatically generates one or more SQL statements (e.g., one or more SQL queries) that are designed to access the desired information. The system data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for new account routing to user account sets, the apparatus comprising:
   one or more processors; and
   a non-transitory computer readable medium storing a plurality of instructions, which when executed, cause the one or more processors to:
   create an account profile for each set of accounts of a plurality of sets of accounts which are assigned as sales responsibilities to a corresponding plurality of users, based on a plurality of firmographic attributes associated with each account of the plurality of sets of accounts, wherein the account profiles model probability distributions;

determine a plurality of account similarity scores for an unassigned account, which is pending assignment as a sales responsibility to any of the plurality of users who are assigned sales responsibilities for the plurality of sets of accounts, by comparing a plurality of firmographic attributes associated with the unassigned account against the corresponding plurality of accounts profiles;

identify a highest account similarity score of the plurality of account similarity scores; and assign a sales responsibility for the unassigned account to a user who is assigned a sales responsibility for a set of accounts, of the plurality of sets of accounts, corresponding to the highest account similarity score.

2. The system of claim 1, wherein creating the plurality of accounts profiles for the plurality of sets of accounts is further based on recency-weighting each account of the plurality of sets of accounts.

3. The system of claim 1, wherein creating the plurality of accounts profiles for the plurality of sets of accounts comprises accommodating a missing firmographic attribute value in the plurality of sets of accounts.

4. The system of claim 1, wherein creating the plurality of accounts profiles for the plurality of sets of accounts is further based on a user provided firmographic attribute preference.

5. The system of claim 1, wherein the plurality of sets of accounts is further associated with at least one of a plurality of users and a random sampling of accounts.

6. The system of claim 1, wherein creating the plurality of accounts profiles for the plurality of sets of accounts comprises adjusting for a firmographic attribute dependency in the plurality of sets of accounts.

7. The system of claim 1, wherein creating the plurality of accounts profiles for the plurality of sets of accounts is further based on at least one user success attribute associated with each account of the plurality of sets of accounts.

8. A computer program product comprising computer-readable program code to be executed by one or more processors when retrieved from a non-transitory computer-readable medium, the program code including instructions to:

create, by a database system, an account profile for each set of accounts of a plurality of sets of accounts which are assigned as sales responsibilities to a corresponding plurality of users, based on a plurality of firmographic attributes associated with each account of the plurality of sets of accounts, wherein the account profiles model probability distributions;

determine, by the database system, a plurality of account similarity scores for an unassigned account, which is pending assignment as a sales responsibility to any of the plurality of users who are assigned sales responsibilities for the plurality of sets of accounts, by comparing a plurality of firmographic attributes associated with the unassigned account against the corresponding plurality of accounts profiles;

identify, by the database system, a highest account similarity score of the plurality of account similarity scores; and assign, by the database system, a sales responsibility for the unassigned account to a user who is assigned a sales responsibility for a set of accounts, of the plurality of sets of accounts, corresponding to the highest account similarity score.

9. The computer program product of claim 8, wherein creating the plurality of accounts profiles for the plurality of sets of accounts is further based on recency-weighting each account of the plurality of sets of accounts.

10. The computer program product of claim 8, wherein creating the plurality of accounts profiles for the plurality of sets of accounts comprises accommodating a missing firmographic attribute value in the plurality of sets of accounts.

11. The computer program product of claim 8, wherein creating the plurality of accounts profiles for the plurality of sets of accounts is further based on a user provided firmographic attribute preference.

12. The computer program product of claim 8, wherein the plurality of sets of accounts is further associated with at least one of a plurality of users and a random sampling of accounts.

13. The computer program product of claim 8, wherein creating the plurality of accounts profiles for the plurality of sets of accounts comprises adjusting for a firmographic attribute dependency in the plurality of sets of accounts.

14. The computer program product of claim 8, wherein creating the plurality of accounts profiles for the plurality of sets of accounts is further based on at least one user success attribute associated with each account of the plurality of sets of accounts.

15. A method for new account routing to user account sets stored in a database system, the method comprising:

creating, by the database system, an account profile for each set of accounts of a plurality of sets of accounts which are assigned as sales responsibilities to a corresponding plurality of users, based on a plurality of firmographic attributes associated with each account of the plurality of sets of accounts, wherein the account profiles model probability distributions;

determining, by the database system, a plurality of account similarity scores for an unassigned account, which is pending assignment as a sales responsibility to any of the plurality of users who are assigned sales responsibilities for the plurality of sets of accounts, by comparing a plurality of firmographic attributes associated with the unassigned account against the corresponding plurality of accounts profiles;

identifying, by the database system, a highest account similarity score of the plurality of account similarity scores; and assign, by the database system, a sales responsibility for the unassigned account to a user who is assigned a sales responsibility for a set of accounts, of the plurality of sets of accounts, corresponding to the highest account similarity score.

16. The method of claim 15, wherein creating the plurality of accounts profiles for the plurality of sets of accounts is further based on at least one of a user provided firmographic attribute preference and recency-weighting each account of the plurality of sets of accounts.

17. The method of claim 15, wherein creating the plurality of accounts profiles for the plurality of sets of accounts comprises accommodating a missing firmographic attribute value in the plurality of sets of accounts.

18. The method of claim 15, wherein the plurality of sets of accounts is further associated with at least one of a plurality of users and a random sampling of accounts.

19. The method of claim 15, wherein creating the plurality of accounts profiles for the plurality of sets of accounts comprises adjusting for a firmographic attribute dependency in the plurality of sets of accounts.

20. The method of claim 15, wherein creating the plurality of s profiles for the plurality of sets of accounts is further based on at least one user success attribute associated with each account of the plurality of sets of accounts.

* * * * *